US006891968B2

(12) United States Patent
Janardhanan

(10) Patent No.: US 6,891,968 B2
(45) Date of Patent: May 10, 2005

(54) METHOD TO UPSCALE SINGLE-PIXEL WIDE TEXT WITHOUT LOSS OF IMAGE SHARPNESS

(75) Inventor: Jayawardan Janardhanan, Tamil Nadu (IN)

(73) Assignee: Texas Instruments Incorporated, Dallas, TX (US)

(*) Notice: Subject to any disclaimer, the term of this patent is extended or adjusted under 35 U.S.C. 154(b) by 681 days.

(21) Appl. No.: 10/025,513

(22) Filed: Dec. 19, 2001

(65) Prior Publication Data

US 2003/0112255 A1 Jun. 19, 2003

(51) Int. Cl.[7] .................................................. G06K 9/00

(52) U.S. Cl. ....................................... 382/162; 382/298

(58) Field of Search ................................ 382/162–167, 382/298–300; 345/587–611; 358/504–540

(56) References Cited

U.S. PATENT DOCUMENTS

| | | | | | |
|---|---|---|---|---|---|
| 4,907,282 | A | * | 3/1990 | Daly et al. | 382/242 |
| 5,400,053 | A | * | 3/1995 | Johary et al. | 345/691 |
| 5,583,953 | A | * | 12/1996 | Harrington | 382/239 |
| 5,953,464 | A | * | 9/1999 | Harrington | 382/299 |
| 6,501,483 | B1 | * | 12/2002 | Wong et al. | 345/611 |
| 6,587,117 | B1 | * | 7/2003 | Wright et al. | 345/601 |
| 6,614,940 | B2 | * | 9/2003 | Azam et al. | 382/242 |

* cited by examiner

*Primary Examiner*—Jingge Wu

(74) *Attorney, Agent, or Firm*—William B. Kempler; W. James Brady, III; Frederick J. Telecky, Jr.

(57) ABSTRACT

A method to upscale single pixel wide text associated with flat panel display applications has a reduced cross-sectional area in two dimensions as compared to scalers that are either rule based or based on pattern matching. The method to upscale single-pixel wide text retains the sharpness of the single pixel text associated with flat panel display applications while requiring substantially smaller memory buffer requirements.

6 Claims, 1 Drawing Sheet

METHOD TO UPSCALE SINGLE-PIXEL WIDE TEXT WITHOUT LOSS OF IMAGE SHARPNESS

BACKGROUND OF THE INVENTION

1. Field of the Invention

This invention relates generally to image scalers used for flat panel display applications, and more particularly, to a method to upscale single-pixel wide text that retains the sharpness of the single pixel text associated with flat panel display applications while requiring minimal memory buffer requirements.

2. Description of the Prior Art

Image scalers presently used for applications such as flat panel displays perform quite well for images; but when used for text applications in association with such displays, smudge the edges of the text. Further, some image scalers vary the width of the text disproportionately. In view of the foregoing, it is desirable to provide a scaler technique that will retain the sharpness of single pixel text and the relative widths of the text. It is further desirable that such a scaler technique be implemented with hardware that employs as small a memory buffer as possible.

SUMMARY OF THE INVENTION

The present invention is directed to a method to upscale single-pixel wide text that retains the sharpness of the single pixel text associated with flat panel display applications while requiring minimal memory buffer requirements.

According to one embodiment of the present invention, a method of upscaling single-pixel wide text comprises the steps of:

selecting at least one group of four input pixels such that each input pixel in the at least one group is adjacent to each other input pixel in the at least one group;

dividing the at least one group of four input pixels into four quadrants such that the four input pixels define an outer boundary of the four quadrants and further such that the four input pixels define a rectangular input mask having a pair of diagonal lines;

selecting an output pixel within any one of the four quadrants;

determining a position of the output pixel with respect to each of the four input pixels to locate the input pixel closest to the output pixel;

determining if the output pixel is further from the closest input pixel in the x-direction or in the y-direction to ascertain a first further direction;

determining a color associated with the adjacent pixel in the first further direction;

determining a color associated with the closest input pixel;

assigning a foreground color to the output pixel solely when the color associated with the adjacent input pixel in the first further direction and the color associated with the closest input pixel are both of the foreground color;

assigning a background color to the output pixel when the color associated with the adjacent pixel in the first further direction and the color associated with the closest input pixel are not both of foreground color;

determining if the output pixel is positioned on one of the diagonal lines and is closer to the center of the input mask than to the closest input pixel to ascertain a second further direction;

determining a color associated with the adjacent pixel in the second further direction;

assigning a foreground color to the output pixel solely when the color associated with the adjacent input pixel in the second further direction and the color associated with the closest input pixel are both of the foreground color;

assigning a background color to the output pixel when the color associated with the adjacent pixel in the second further direction and the color associated with the closest input pixel are not both of foreground color; and assigning to the output pixel, the color associated with the closest input pixel, in the absence of the first and second further directions.

According to another embodiment of the present invention, a method of upscaling single-pixel wide text comprises the steps of:

selecting at least one group of four input pixels such that each input pixel in the at least one group is adjacent to each other input pixel in the at least one group;

dividing the at least one group of four input pixels into four quadrants such that the four input pixels define a rectangular input mask and further define an outer boundary of the four quadrants;

determining a set of diagonal lines for the rectangular input mask wherein each diagonal line has a width defined by the reciprocal of a respective scale factor;

selecting an output pixel within any one of the four quadrants;

determining a position of the output pixel with respect to each of the four input pixels to locate the input pixel closest to the output pixel;

determining if the output pixel is further from the closest input pixel in the x-direction or in the y-direction to ascertain a further direction;

determining a color associated with the adjacent pixel in the further direction;

determining a color associated with the closest input pixel;

assigning a foreground color to the output pixel solely when the color associated with the adjacent input pixel in the further direction and the color associated with the closest input pixel are both of the foreground color;

assigning a background color to the output pixel when the color associated with the adjacent pixel in the further direction and the color associated with the closest input pixel are not both of foreground color;

determining if the output pixel is positioned on one of the diagonal lines;

assigning a foreground color to the output pixel solely when the color associated with the diagonal line containing the output pixel and the color associated with the closest input pixel are both of the foreground color;

assigning a background color to the output pixel when the color associated with the diagonal line containing the output pixel is not of foreground color; and assigning to the output pixel, the color associated with the closest input pixel, in the absence of the further direction and when the output pixel is not positioned on one of the diagonal lines.

In one aspect of the invention, a method to upscale single pixel wide text associated with flat panel display applications is provided having a reduced cross-sectional area in two dimensions as compared to scalers that are either rule based or based on pattern matching.

In another aspect of the invention, a method to upscale single pixel wide text associated with flat panel display applications is provided having smaller memory buffer requirements than scalers that are either rule based or based on pattern matching.

In still another aspect of the invention, a method to upscale single pixel wide text associated with flat panel display applications is implemented with straight forward and simple algorithmic techniques as compared to pattern matching and rule based scalers.

In yet another aspect of the invention, a method to upscale single pixel wide text associated with flat panel display applications is provided with minimal hardware as compared to pattern matching and rule based scalers.

In still another aspect of the invention, a method to upscale single pixel wide text associated with flat panel display applications is provided having improved sharpness and/or clarity as compared to other generic image scalers.

In still another aspect of the invention, a method to upscale single pixel wide text associated with flat panel display applications is capable of scaling to any factor greater than one.

In still another aspect of the invention, a method to upscale single pixel wide text associated with flat panel display applications requires only 2×2 taps resulting in hardware efficiency.

In still another aspect of the invention, a generic method is provided to upscale single pixel wide text associated with flat panel display applications to increase sharpness.

In still another aspect of the invention, a method to upscale single pixel wide text associated with flat panel display applications is provided having the capability to output a single pixel wide text, a two pixel wide text, or greater, to accommodate scaling factors greater than or equal to two.

BRIEF DESCRIPTION OF THE DRAWINGS

Other aspects, features and advantages of the present invention will be readily appreciated as the invention becomes better understood by reference to the following detailed description when considered in connection with the accompanying drawing figure wherein.

Figure 1:
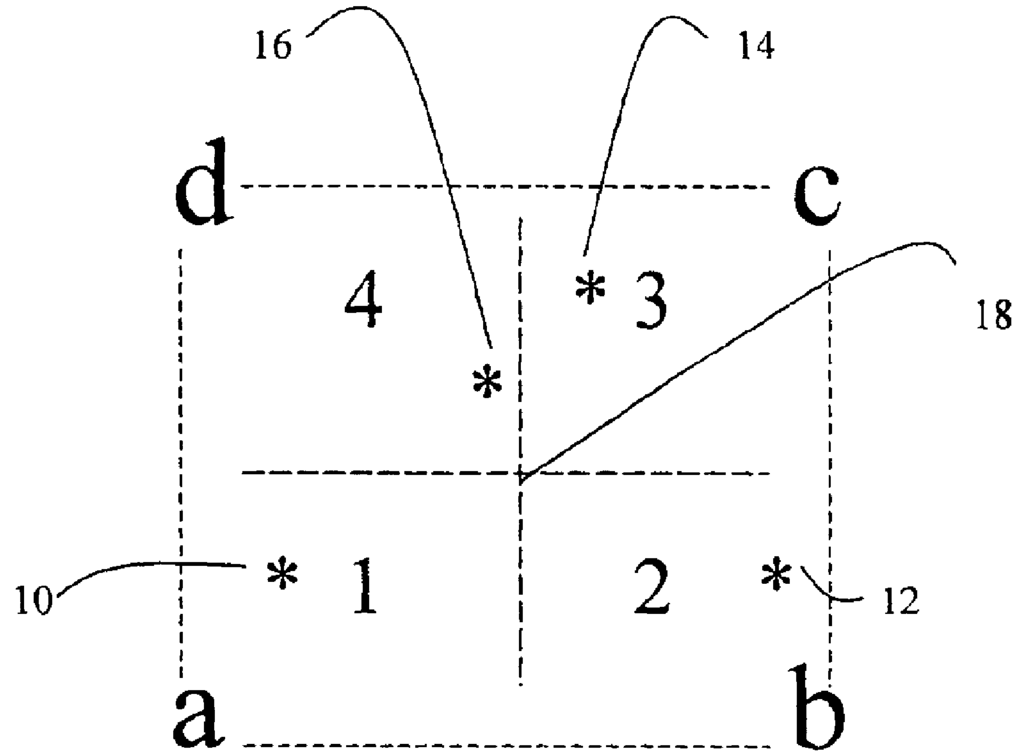
FIG. 1 is a diagram illustrating the mapping of an output pixel with respect to an input pixel according to one embodiment of the present invention wherein the mapping employs four quadrants.

While the above-identified drawing figure sets forth a particular embodiment, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

As stated herein before, image scalers presently used for applications such as flat panel displays perform quite well for images; but when used for text applications in association with such displays, smudge the edges of the text. In view of the foregoing, it is desirable to provide a scaler technique that will retain the sharpness of single pixel text. It is further desirable that such a scaler technique be implemented with hardware that employs as small a memory buffer as possible.

Looking now at FIG. 1, a mapping diagram illustrates the mapping of an output pixel (e.g. 10, 12, 14, 16) with respect to an input pixel (a,b,c,d) according to one embodiment of the present invention wherein the mapping employs four quadrants (1,2,3,4). This output pixel mapping is achieved by mapping the relative output pixel(s), e.g., 10, 12, 14 and/or 16 position onto the input pixel (a,b,c,d) position, which is obtained by multiplying the output pixel position by the reciprocal of the respective scaling factors and retaining the output pixel(s) closest to the input. This technique of upscaling prevents any loss of information, but results in a loss of continuity between adjacent pixels. The continuity can be retained in addition to finding the closest pixel(s) however, using techniques according to particular embodiments of the present invention as now set forth herein below.

With continued reference to FIG. 1, mapping of the output pixel(s), e.g., 10, 12, 14, 16, with respect to an input pixel (a,b,c,d) is first divided into four quadrants (1,2,3,4), where 'a' represents the position of the input pixel (x,y), 'b' represents the position of the input pixel (x+1, y), 'c' represents the position of the input pixel (x+1, y+1) and 'd' represents the position of the input pixel (x, y+1). An output pixel in quadrant 1 is closer to the input pixel 'a'; and an output pixel in quadrant 2 is closer to the input pixel 'b', and so on. Next, the position of a particular output pixel, e.g., 10, 12, 14, 16 with respect to the input pixel is determined, i.e., if it is the closest, or further in the x-direction, or further in the y-direction, or further in both directions. There are many ways to determine if an output pixel, e.g., 10, 12, 14, 16 is the closest to an input pixel. According to one embodiment, one can compare with the neighboring output pixel to determine if the current output pixel is the closest or not, and also to determine if the current output pixel is further away in the x-direction, y-direction, or both directions. According to another embodiment, one can determine the fractional amount by which the output pixel is further away from the corresponding input pixel in both x and y directions. If this amount is larger than half of the reciprocal of the scale factor (scaling ratio) in that direction, then it is said to be further in that direction; else it is the closest in that direction. Hence, if an output pixel is the closest in both directions, then that output pixel is the closest output pixel to the corresponding input pixel. Having determined, the closest output pixel to the input pixel, the color of the input pixel is then given to the output pixel.

Continuity checks are additionally performed in the x and y directions. If the output pixel is further in only one of the directions (x or y), then the adjacent input pixel in that direction is checked for foreground color along with the closest input pixel. If these two input pixels are of foreground color, then the output pixel is also given foreground color; else background color is given to the output pixel. The background color can be determined using techniques that are well known in the art, and so will not be discussed in further detail herein in order to better preserve brevity and clarity of the discussion that follows below. The present invention is not so limited however, and it shall be understood that the present invention can be implemented using any background color detection scheme so long as the scheme is capable of providing the necessary background color information in a format suitable for use with the present invention. The foregoing procedure then ensures continuity along horizontal and vertical lines.

Continuity checks along diagonals are also performed to determine the output pixel position with respect to the input pixel. According to one embodiment, any output pixel closest to the center 18 of the input mask shown in FIG. 1 is checked for any of the two diagonal cases in which either the input pixels 'a' and 'c' or the input pixels 'b' and 'd' are of foreground color. Again, the closest pixel to the center can be found using the techniques discussed herein before to find the closest output pixel (center as opposed to input pixel). In such cases, the output pixel is given the foreground color. According to another embodiment, one must fit a diagonal line having a width given by the reciprocal of the scale factor. Any output pixel that maps into this region is then given the foreground color, provided the input diagonal line is also of foreground color.

The first method of performing continuity checks discussed above was found by the present inventor to not provide good results in cases where the output required is still single pixel wide text for scaling factors greater than two, although this method was found to be highly hardware efficient. The second method was found by the present inventor to provide the desired results in all cases, but was also found to be hardware intensive. It can be easily appreciated that a 2×2 mask, such as depicted in FIG. 1, only allows for three possible continuity check scenarios including, closest, straight line, and diagonal continuity, all discussed herein above.

In summary explanation of the foregoing detailed description of the embodiments of the invention, a method is provided to upscale single-pixel wide text without loss of image sharpness. The method is straight forward, requiring only a 2×2 mask, in contradistinction with known algorithms that may require a complete frame information and/or are based on pattern matching. Further, the present method accommodates an output that can be either single pixel wide or two-pixel wide when associated with scaling factors greater than two. Similarly, for scaling factors greater than three, the output can either be one, two or three-pixel wide simply by choosing one, two or three output pixels closest to the corresponding input pixel. This can easily be implemented in the second embodiment described herein before when finding the closest output pixel to the input pixel, by just multiplying the term to be compared with (half of the reciprocal of the scale factor), by the number of pixel width required at the output. Detection of single-pixel text can be determined using any technique that is known to or easily implemented by those skilled in the art, and so has not been discussed in further detail herein above in order to better preserve brevity and clarity of the foregoing discussion. The present invention is not so limited however, and it shall be understood that the present invention can be implemented using any single-pixel text detection scheme so long as the scheme is capable of providing the necessary information in a format suitable for use with the present invention. The present invention can be implemented, for example, according to one embodiment in which a simple image has a fixed background color and the single-pixel text is fixed.

In view of the above, it can be seen the present invention presents a significant advancement in the art of upscaling single-pixel wide text. Further, this invention has been described in considerable detail in order to provide those skilled in the digital audio/video art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of upscaling single-pixel wide text comprising the steps of:

selecting at least one group of four input pixels such that each input pixel in the at least one group is adjacent to each other input pixel in the at least one group;

dividing the at least one group of four input pixels into four quadrants such that the four input pixels define an outer boundary of the four quadrants and further such that the four input pixels define a rectangular input mask having a pair of diagonal lines;

selecting an output pixel within any one of the four quadrants;

determining a position of the output pixel with respect to each of the four input pixels to locate the input pixel closest to the output pixel;

determining if the output pixel is further from the closest input pixel in the x-direction or in the y-direction to ascertain a first further direction;

determining a color associated with the adjacent pixel in the first further direction;

determining a color associated with the closest input pixel;

assigning a foreground color to the output pixel solely when the color associated with the adjacent input pixel in the first further direction and the color associated with the closest input pixel are both of the foreground color;

assigning a background color to the output pixel when the color associated with the adjacent pixel in the first further direction and the color associated with the closest input pixel are not both of foreground color;

determining if the output pixel is positioned on one of the diagonal lines and is closer to the center of the input mask than to the closest input pixel to ascertain a second further direction;

determining a color associated with the adjacent pixel in the second further direction;

assigning a foreground color to the output pixel solely when the color associated with the adjacent input pixel in the second further direction and the color associated with the closest input pixel are both of the foreground color;

assigning a background color to the output pixel when the color associated with the adjacent pixel in the second further direction and the color associated with the closest input pixel are not both of foreground color; and assigning to the output pixel, the color associated with the closest input pixel, in the absence of the first and second further directions.

2. The method according to claim 1 wherein the step of determining a position of the output pixel with respect to each of the four input pixels to locate the input pixel closest to the output pixel comprises comparing the position of the output pixel with respect to a neighboring output pixel.

3. The method according to claim 1 wherein the step of determining a position of the output pixel with respect to each of the four input pixels to locate the input pixel closest to the output pixel comprises the steps of:

determining a fractional amount by which the output pixel is further away from the closest input pixel in both x and y directions;

determining whether the fractional amount is larger than one-half of the reciprocal of a scale factor associated with each of the x and y directions; and associating the output pixel with the closest input pixel defined when the fractional amount is less than one-half of the reciprocal of a scale factor associated with each of the x and y directions.

4. A method of upscaling single-pixel wide text comprising the steps of:

selecting at least one group of four input pixels such that each input pixel in the at least one group is adjacent to each other input pixel in the at least one group;

dividing the at least one group of four input pixels into four quadrants such that the four input pixels define a rectangular input mask and further define an outer boundary of the four quadrants;

determining a set of diagonal lines for the rectangular input mask wherein each diagonal line has a width defined by the reciprocal of a respective scale factor;

selecting an output pixel within any one of the four quadrants;

determining a position of the output pixel with respect to each of the four input pixels to locate the input pixel closest to the output pixel;

determining if the output pixel is further from the closest input pixel in the x-direction or in the y-direction to ascertain a further direction;

determining a color associated with the adjacent pixel in the further direction;

determining a color associated with the closest input pixel;

assigning a foreground color to the output pixel solely when the color associated with the adjacent input pixel in the further direction and the color associated with the closest input pixel are both of the foreground color;

assigning a background color to the output pixel when the color associated with the adjacent pixel in the further direction and the color associated with the closest input pixel are not both of foreground color;

determining if the output pixel is positioned on one of the diagonal lines;

assigning a foreground color to the output pixel solely when the color associated with the diagonal line containing the output pixel and the color associated with the closest input pixel are both of the foreground color;

assigning a background color to the output pixel when the color associated with the diagonal line containing the output pixel is not of foreground color; and assigning to the output pixel, the color associated with the closest input pixel, in the absence of the further direction and when the output pixel is not positioned on one of the diagonal lines.

5. The method according to claim 4 wherein the step of determining a position of the output pixel with respect to each of the four input pixels to locate the input pixel closest to the output pixel comprises comparing the position of the output pixel with respect to a neighboring output pixel.

6. The method according to claim 4 wherein the step of determining a position of the output pixel with respect to each of the four input pixels to locate the input pixel closest to the output pixel comprises the steps of:

determining a fractional amount by which the output pixel is further away from the closest input pixel in both x and y directions;

determining whether the fractional amount is larger than one-half of the reciprocal of a scale factor associated with each of the x and y directions; and associating the output pixel with the closest input pixel defined when the fractional amount is less than one-half of the reciprocal of a scale factor associated with each of the x and y directions.

* * * * *